(12) United States Patent
Ortiz et al.

(10) Patent No.: US 8,840,308 B2
(45) Date of Patent: Sep. 23, 2014

(54) ADHESIVE FILM FOR BUSHINGS

(75) Inventors: Paul W. Ortiz, Natick, MA (US); Julia DiCorleto Gibson, Bedford, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 194 days.

(21) Appl. No.: 13/300,381

(22) Filed: Nov. 18, 2011

(65) Prior Publication Data

US 2012/0128280 A1    May 24, 2012

Related U.S. Application Data

(60) Provisional application No. 61/415,463, filed on Nov. 19, 2010.

(51) Int. Cl.
| | |
|---|---|
| *F16C 33/02* | (2006.01) |
| *F16C 33/18* | (2006.01) |
| *F16C 33/20* | (2006.01) |
| *B32B 27/08* | (2006.01) |
| *B32B 1/08* | (2006.01) |
| *B32B 27/20* | (2006.01) |
| *B32B 27/32* | (2006.01) |
| *B32B 3/04* | (2006.01) |
| *B32B 7/12* | (2006.01) |
| *B32B 15/085* | (2006.01) |
| *B32B 37/12* | (2006.01) |

(52) U.S. Cl.
CPC ........... *F16C 33/203* (2013.01); *B32B 2475/00* (2013.01); *B23B 15/18* (2013.01); *B32B 27/08* (2013.01); *B32B 37/12* (2013.01); *B32B 1/08* (2013.01); *B32B 27/20* (2013.01); *B32B 27/322* (2013.01); *B32B 2250/04* (2013.01); *B32B 2605/08* (2013.01); *B32B 2305/30* (2013.01); *B32B 2307/744* (2013.01); *B32B 3/04* (2013.01); *B32B 7/12* (2013.01); *B32B 2307/56* (2013.01); *B32B 15/085* (2013.01); *B32B 2597/00* (2013.01); *B32B 2250/05* (2013.01); *Y10S 384/909* (2013.01); *Y10S 384/907* (2013.01)
USPC ............ 384/297; 384/276; 384/909; 384/907

(58) Field of Classification Search
USPC ........... 384/42, 129, 276, 297, 299, 300, 907, 384/909
See application file for complete search history.

(56) References Cited

U.S. PATENT DOCUMENTS

| | | |
|---|---|---|
| 3,575,787 A | 4/1971 | Pietrocini et al. |
| 4,351,882 A | 9/1982 | Concannon |

(Continued)

FOREIGN PATENT DOCUMENTS

| | | |
|---|---|---|
| CN | 1261379 A | 7/2000 |
| DE | 29822036 U1 | 2/1999 |

(Continued)

OTHER PUBLICATIONS

Dyneon, Technical information, 2001-2002, 1-7.

(Continued)

*Primary Examiner* — Alan B Waits
(74) *Attorney, Agent, or Firm* — Chi Suk Kim; Abel Law Group, LLP

(57) ABSTRACT

A bushing can include a load bearing substrate having a first major surface, an adhesive film overlying the first major surface, and a friction reducing layer overlying the adhesive film. A method can include extruding an adhesive film, laminating a friction reducing layer to a load bearing substrate with the adhesive film therebetween to form a composite, and shaping the composite to form a bushing. The adhesive film can include a first adhesive layer, such as and a fluoropolymer layer. The adhesive layer can include a modified ethylene tetrafluoroethylene, and the fluoropolymer layer can include an ethylene tetrafluoroethylene.

14 Claims, 5 Drawing Sheets

(56) References Cited

U.S. PATENT DOCUMENTS

| | | | |
|---|---|---|---|
| 4,430,406 A | 2/1984 | Newkirk et al. | |
| 4,916,020 A | 4/1990 | Golding et al. | |
| 5,106,673 A | 4/1992 | Effenberger et al. | |
| 5,238,748 A | 8/1993 | Effenberger et al. | |
| 5,573,846 A | 11/1996 | Harig et al. | |
| 5,576,106 A * | 11/1996 | Kerbow et al. | 428/403 |
| 5,626,907 A | 5/1997 | Hagiwara et al. | |
| 5,728,230 A | 3/1998 | Komori et al. | |
| 5,855,977 A | 1/1999 | Fukushi | |
| 5,941,286 A | 8/1999 | Fauble et al. | |
| 6,060,175 A | 5/2000 | Swisher | |
| 6,258,413 B1 | 7/2001 | Woelki et al. | |
| 6,372,870 B1 | 4/2002 | Kitahara et al. | |
| 6,391,458 B1 | 5/2002 | Zander et al. | |
| 6,465,726 B2 | 10/2002 | Yamada et al. | |
| 6,479,941 B1 | 11/2002 | Abe et al. | |
| 6,599,997 B2 | 7/2003 | Araki et al. | |
| 6,610,807 B2 | 8/2003 | Duchesne et al. | |
| 6,648,512 B1 * | 11/2003 | Storch et al. | 384/275 |
| 6,677,044 B2 | 1/2004 | Oka et al. | |
| 6,740,375 B1 | 5/2004 | Sagisaka et al. | |
| 7,270,870 B2 | 9/2007 | Hetzler et al. | |
| 2003/0029493 A1 | 2/2003 | Plessing | |
| 2003/0198770 A1 | 10/2003 | Fukushi et al. | |
| 2003/0198771 A1 | 10/2003 | Fukushi et al. | |
| 2004/0244829 A1 | 12/2004 | Rearick et al. | |
| 2005/0025923 A1 | 2/2005 | Saupe et al. | |
| 2005/0268961 A1 | 12/2005 | Hetzler et al. | |
| 2005/0271867 A1 | 12/2005 | Hetzler et al. | |
| 2006/0251887 A1 | 11/2006 | Welsch | |
| 2008/0302556 A1 | 12/2008 | Varkey et al. | |
| 2009/0052822 A1 | 2/2009 | Hardgrave et al. | |
| 2010/0092119 A1 * | 4/2010 | Angenheister | 384/498 |
| 2010/0098360 A1 | 4/2010 | Schmitjes et al. | |
| 2013/0233587 A1 * | 9/2013 | Varkey et al. | 174/110 SR |

FOREIGN PATENT DOCUMENTS

| | | |
|---|---|---|
| EP | 0658943 A1 | 6/1995 |
| EP | 0680095 A2 | 11/1995 |
| EP | 0992518 A1 | 4/2000 |
| EP | 1039199 A2 | 9/2000 |
| EP | 1160270 A1 | 12/2001 |
| EP | 1249338 A2 | 10/2002 |
| JP | 07302925 A1 | 11/1995 |
| JP | 1024537 | 1/1998 |
| JP | 11106589 A | 4/1999 |
| JP | 200130440 A | 2/2001 |
| JP | 200144474 A | 2/2001 |
| JP | 2002-194380 A | 7/2002 |
| JP | 2003502843 A | 1/2003 |
| JP | 2004255805 A | 9/2004 |
| KR | 10-2010-0012028 A | 2/2010 |
| WO | 00/77458 A1 | 12/2000 |
| WO | 2005120829 A1 | 12/2005 |
| WO | 2005122283 A1 | 12/2005 |
| WO | 2010/039137 A1 | 4/2010 |
| WO | 2012068530 A2 | 5/2012 |

OTHER PUBLICATIONS

Sina Ebnesajjad, Fluoroplastics: vol. 2, Melt Processible Fluoropolymers, copyright 2003, Plastics Design Library, p. 124 & 137.

U.S. Appl. No. 10/862,121, filed Jun. 4, 2004, Inventors: Kevin G. Hetzler et al.

U.S. Appl. No. 10/862,053, filed Jun. 4, 2004, Inventors: Kevin G. Hetzler et al.

International Search Report for PCT/US2011/061509 dated Jul. 2, 2012, 2 pgs.

International Search Report for PCT/US2005/019025 dated Sep. 22, 2005, 2 pgs.

International Search Report for PCT/US2005/019024 dated Oct. 11, 2005, 4 pgs.

* cited by examiner

ADHESIVE FILM FOR BUSHINGS

CROSS-REFERENCE TO RELATED APPLICATION(S)

The present application claims priority from U.S. Provisional Patent Application No. 61/415,463, filed Nov. 19, 2010, entitled "ADHESIVE FILM FOR BUSHINGS," naming inventors Paul W. Ortiz and Julia DiCorleto Gibson, which application is incorporated by reference herein in its entirety.

FIELD OF THE DISCLOSURE

The present disclosure generally relates to bushings, and more particularly relates to an adhesive film for bushings.

BACKGROUND

Sliding bearing composite materials consisting of a load bearing substrate and a friction reducing layer overlay are generally known.

Sliding bearing composite materials can be used to form a variety of bearings, such as plain bearing bushing used, for example, by the automotive industry. Such plain bearing bushings can be used for door, hood, and engine compartment hinges, seats, steering columns, flywheels, balancer shaft bearings, etc. Additionally, plain bearing bushings formed from the sliding bearing composite materials can also be used in non-automotive applications.

One method of enhancing the adhesion between a load bearing substrate and the friction reducing layer is to apply a surface treatment to the load bearing substrate, such as chromate or a chromic acid treated phosphate. However, surface treatment can include the use of toxic compounds such as hexavalent chromium. Thus, there is an ongoing need for improved bearings that do not rely upon surface treatments such as chromate.

SUMMARY

In an exemplary embodiment, a bushing can include a load bearing substrate having a first major surface, an adhesive film overlying the first major surface, and a friction reducing layer overlying the adhesive layer. The adhesive film can include an adhesive layer and a fluoropolymer layer.

In another exemplary embodiment, a composite can include a metal substrate having a first major surface, an adhesive film overlying the first major surface, and a friction reducing layer overlying the adhesive layer. The adhesive film can include an adhesive layer and an fluoropolymer layer. The adhesive layer can have a thickness of not greater than about 7.5 microns.

In yet another embodiment, a method can include extruding an adhesive film comprising an adhesive layer and a fluoropolymer layer. The method can further include laminating a friction reducing layer to a load bearing substrate with the adhesive film therebetween to form a composite, and shaping the composite to form a bushing.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a bushing can include a load bearing substrate having a first major surface, an adhesive film overlying the first major surface, and a friction reducing layer overlying the adhesive layer. The adhesive film can include a first adhesive layer and a fluoropolymer layer. In a particular embodiment, the adhesive film can include a second adhesive layer with the fluoropolymer layer between the two adhesive layers. The bushing can provide a sliding engagement between two components and reduce surface wear of the two components.

Figure 1:
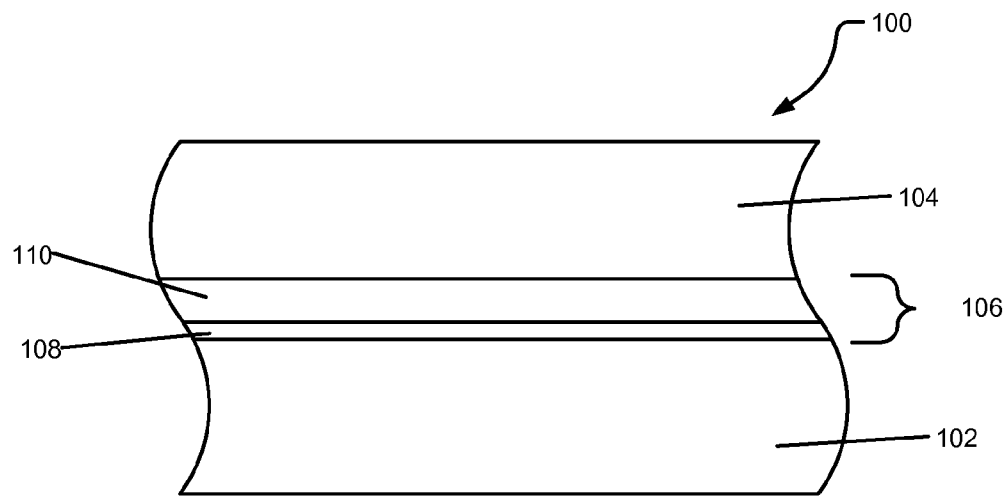
FIGS. 1 and 2 include illustrations of the layer structure of exemplary bushings.

FIG. 1 shows a cross section illustrating the various layers of the vibration damping bushing, generally designated 100. Bushing 100 can include a load bearing substrate 102. The load bearing substrate 102 can be a metallic support layer. The metallic support layer can include a metal or metal alloy such as steel including carbon steel, spring steel, and the like, iron, aluminum, zinc, copper, magnesium, or any combination thereof. In a particular embodiment, the load bearing substrate 102 can include a stainless steel. Further, the load bearing substrate can be substantially free of chromate.

A friction reducing layer 104 can be applied to the load bearing substrate 102 with an adhesive film 106. The friction reducing layer 104 can include a polymer. Examples of polymers that can be used in friction reducing layer 104 include fluoropolymer, polyacetal, polybutylene terephthalate, polyimide, polyetherimide, polyetheretherketone (PEEK), polyethylene, polysulfone, polyamide, polyphenylene oxide, polyphenylene sulfide (PPS), polyurethane, polyester, or any combination thereof. Examples of fluoropolymers can include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer (PFA), or any combination thereof. In a particular embodiment, the friction reducing layer 104 can include PTFE, such as, cast, paste extruded, or skived PTFE. In an embodiment, the friction reducing layer 104 can have a coefficient of friction of not greater than about 0.4, such as not greater than about 0.2, even not greater than about 0.15.

Additionally, friction reducing layer 104 can include fillers, such as a friction reducing filler. Examples of fillers that can be used in the friction reducing layer 102 include glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), aromatic polyesters including liquid crystal polymers (LCP), and mineral particles such as wollastonite and barium sulfate, or any combination thereof. An LCP is a partially oriented aromatic polyester capable of forming highly oriented regions while in the liquid phase. Fillers can be in the form of beads, fibers, powder, mesh, or any combination thereof.

Adhesive film 106 can include an adhesive layer 108 and a fluoropolymer layer 110. In a particular embodiment, the adhesive film 106 can be in direct contact with the load bearing substrate 102

The adhesive layer 108 can include a modified fluoropolymer. The modified fluoropolymer can include a functional group, such as a carboxy group, a carboxy anhydride group, a carboxylic halide group, an ester group, a carbonate group, an epoxy group, a sulfate group, a phosphate group, an amide group, a silyl group, or any combination thereof. In a particular embodiment, the functional group can include maleic anhydride, acrylic acid, or another suitable material. Additionally, fluoropolymer layer 110 can include a melt processible fluoropolymer, such as ETFE, ethylene fluorinated ethylene-propylene (EFEP) terpolymer, polychlorotrifluoroethylene (PCTFE), ethylene chlorotrifluoroethylene (ECTFE), or any combination thereof. In an embodiment, the polymer of the adhesive layer 108 can be a modified variant of the fluoropolymer in the fluoropolymer layer 110. For example, the fluoropolymer layer 110 can include ETFE and the adhesive layer 108 can include a modified ETFE, such as a maleic anhydride modified ETFE or other modified ETFE.

In an embodiment, the adhesive film 106 can have a thickness of about 25 microns to about 75 microns, such as about 30 microns to about 50 microns. Further, the first adhesive layer can have a thickness of about 1 micron to about 7.5 microns, such as about 1.5 microns to about 5 microns. Additionally, the fluoropolymer layer can have a thickness of about 20 microns to about 70 microns, such as about 24 microns to about 45 microns. The ratio of the thickness of the adhesive layer 108 to the thickness of the fluoropolymer layer 110 can be not less than about 1:20, such as not less than about 1:15, even not less than about 1:10. In a particular embodiment, the ratio of the thickness of the adhesive layer to the thickness of the fluoropolymer layer can be not greater than 1:2, such as not greater than 1:4.

Figure 2:
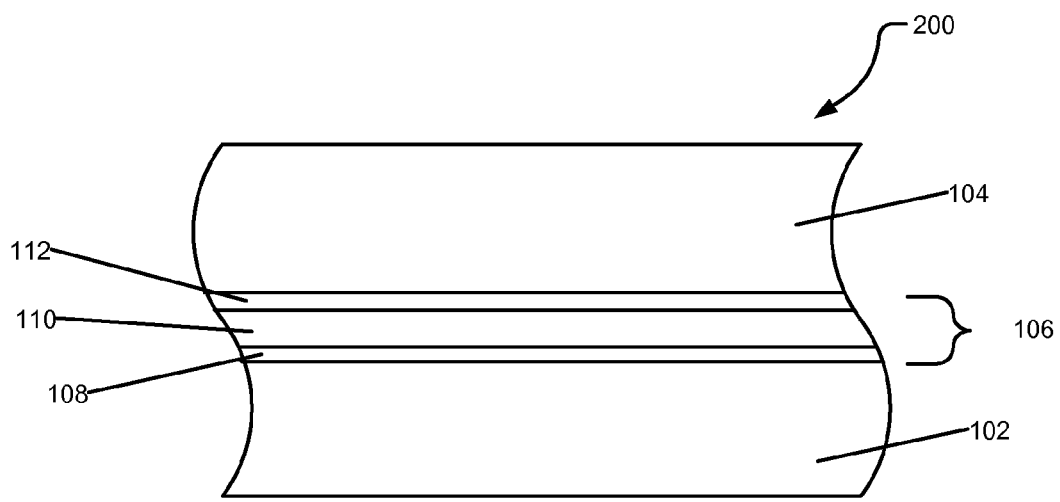

In an alternative embodiment illustrated in FIG. 2, the adhesive film 106 can include a second adhesive layer 112. Fluoropolymer layer 110 can be located between adhesive layers 108 and 112. In an embodiment, the thickness of each adhesive layer can be substantially the same and the ratio of each adhesive layer to the fluoropolymer layer can be not less than 5:90, such as not less than 7.5:85, even not less than 10:80.

Turning to the method of forming the bushing, an adhesive film can be formed by coextruding an adhesive layer and a fluoropolymer layer. Coextruding the adhesive layer and the fluoropolymer layer can include extruding onto a casting drum.

A friction reducing layer, such as a skived fluoropolymer, can be laminated to a load bearing substrate with the adhesive film to form a laminate sheet having the adhesive film between the friction reducing layer and the load bearing substrate. In a particular embodiment, a surface of the friction reducing layer can be etched to enhance bonding between the friction reducing layer and the adhesive film. The laminate sheet can be cut into strips or blanks that can be formed into the bushing. The blanks can be formed into the bushing, such as by rolling and flanging the laminate to form a semi-finished bushing of a desired shape.

In an embodiment, the bushing can have a cylindrically shaped portion. In another embodiment, the bushing can have a conical shape. Further, the bushing can have a flanged portion on one or more ends. Additionally, the friction reducing layer can be on an inner surface of the bushing or on an outer surface of the bushing.

Figure 3:
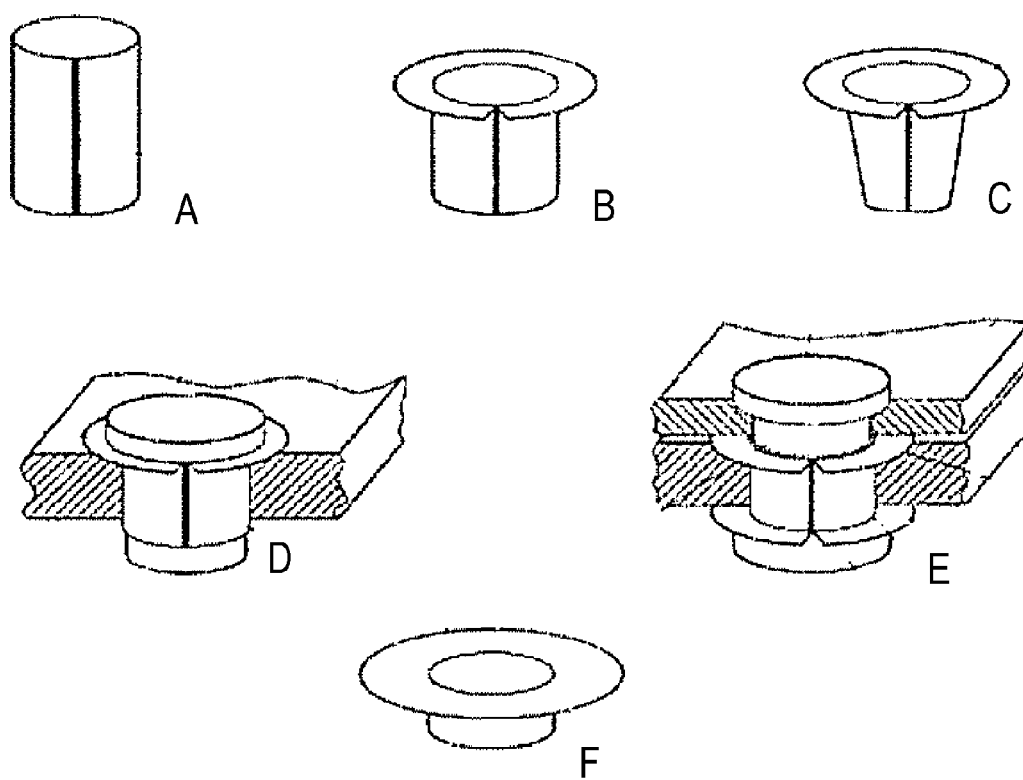
FIG. 3 includes an illustration of various embodiment of bushing.

FIGS. 3A through 3F illustrates a number of bushing shapes that can be formed from the blanks. FIG. 3A illustrates a cylindrical bushing that can be formed by rolling. FIG. 3B illustrates a flanged bushing that can be formed by rolling and flanging. FIG. 3C illustrates a flanged bushing having a tapered cylindrical portion that can be formed by rolling a tapered portion and flanging an end. FIG. 3D illustrates a flanged bushing mounted in a housing with a shaft pin mounted through the flanged bushing. FIG. 3E illustrates a two-sided flanged bushing mounted in a housing with a shaft pin mounted through the two-sided flanged bushing. FIG. 3F illustrates an L type bushing that can be formed using a stamping and cold deep drawing process, rather than rolling and flanging.

Figure 4:
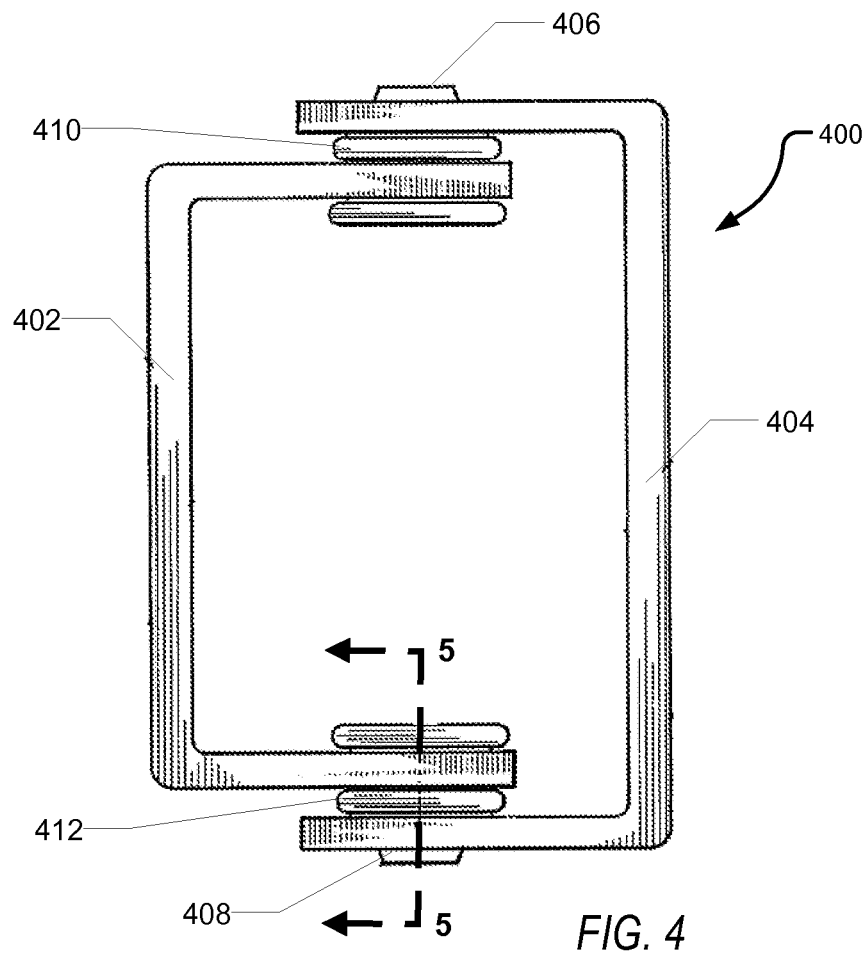
FIGS. 4, 5, and 6 include illustrations of exemplary hinges.
Figure 5:
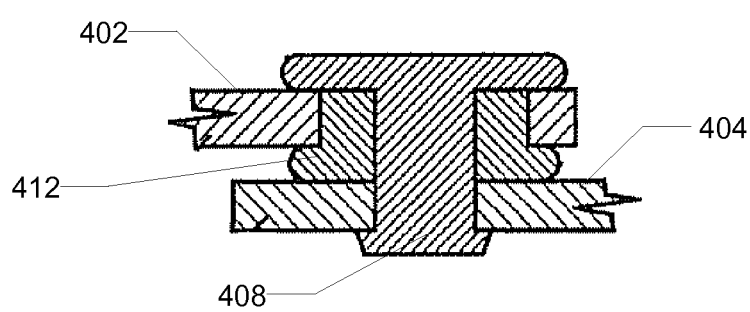

In a particular example, the bushing can be used in a hinge. For example, FIGS. 4 and 5 illustrate an exemplary hinge 400, such as an automotive door hinge, hood hinge, engine compartment hinge, and the like. Hinge 400 can include an inner hinge portion 402 and an outer hinge portion 404. Hinge portions 402 and 404 can be joined by rivets 406 and 408 and bushings 410 and 412. Bushings 410 and 412 can be vibration-damping bushings, as previously described. FIG. 5 illustrates a cross section of hinge 400, showing rivet 408, and bushing 412 in more detail.

Figure 6:
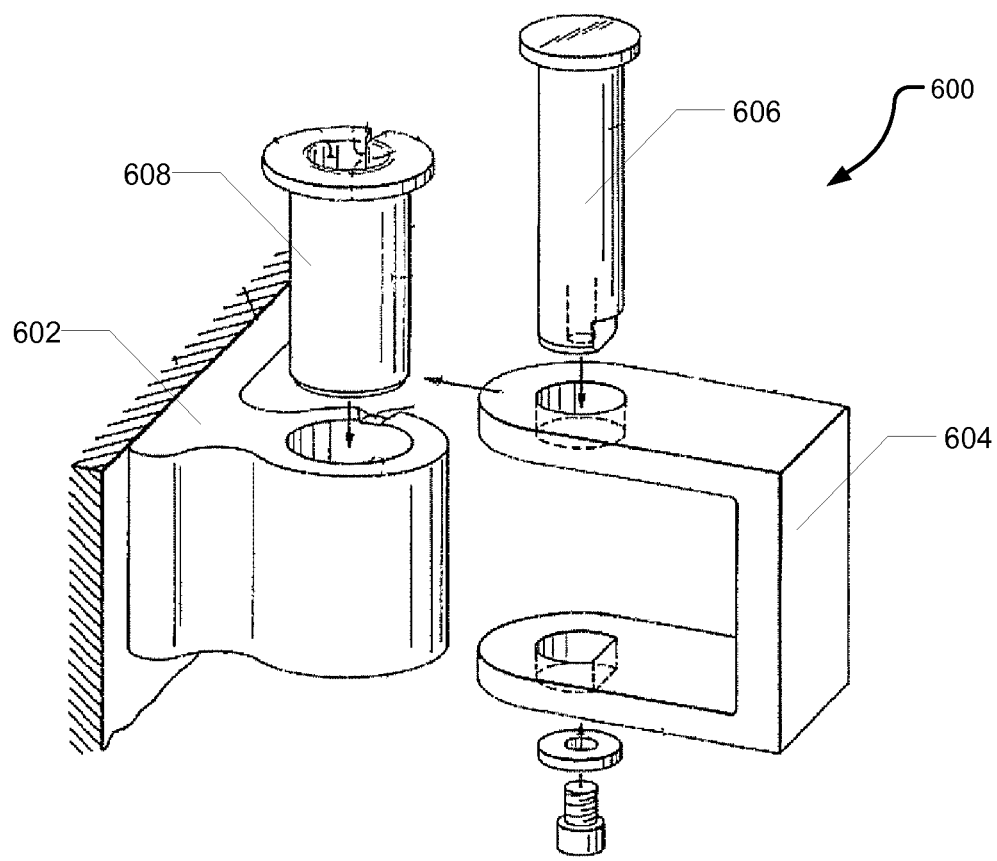

FIG. 6 illustrates another exemplary hinge 600, such as an automotive door hinge, hood hinge, engine compartment hinge, and the like. Hinge 600 can include a first hinge portion 602 and a second hinge portion 604 joined by a pin 606 and a bushing 608. Bushing 608 can be a vibration damping bushing as previously described.

Figure 7:
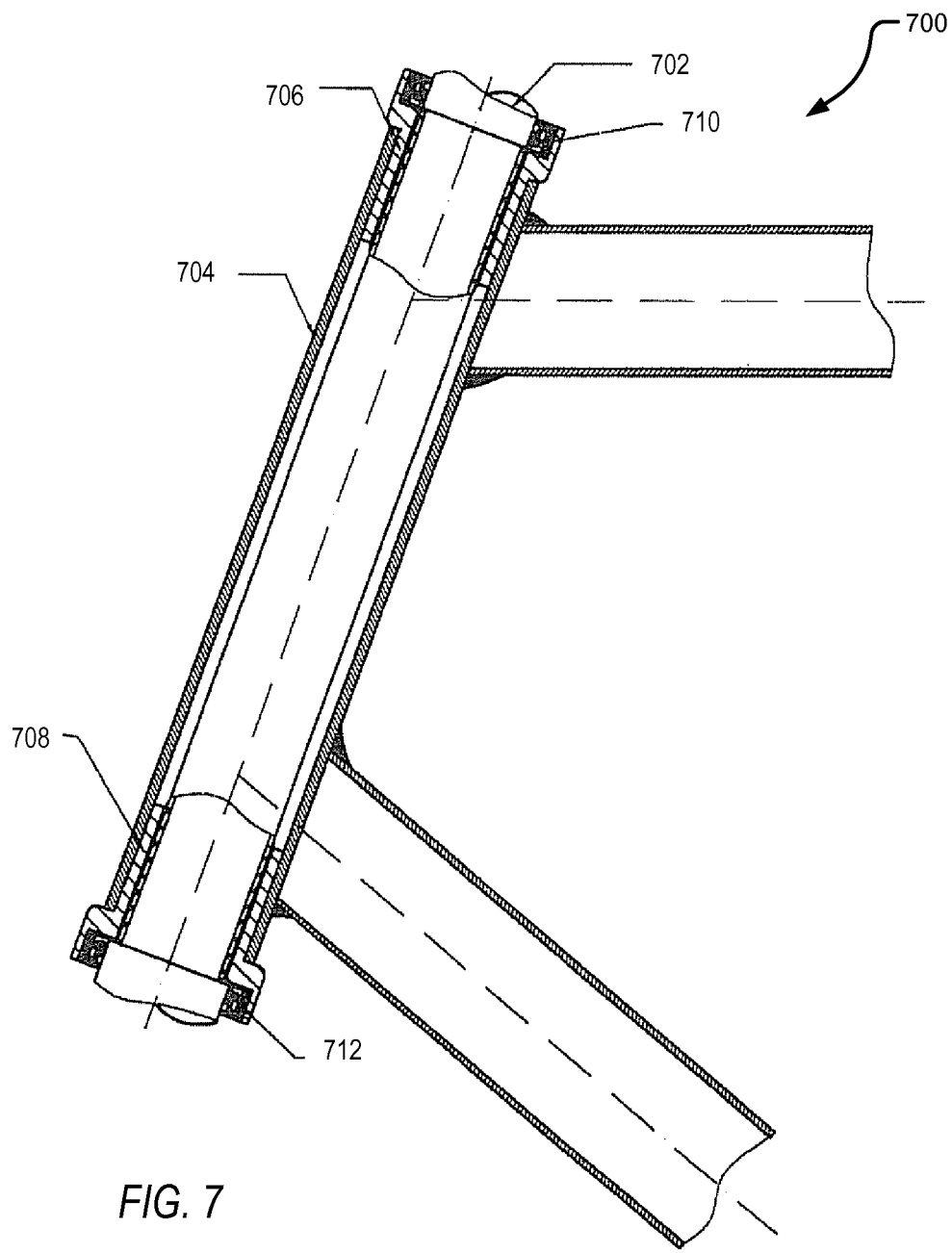
FIG. 7 includes an illustration of an exemplary bicycle headset.

In another example, the bushing can be used in a headset. For example, FIG. 7 illustrates an exemplary headset 700 for a two-wheeled vehicle, such as a bicycle. A steering tube 702 can be inserted through a head tube 704. Bushings 706 and 708 can be placed between the steering tube 702 and the head tube 704 to maintain alignment and prevent contact between the steering tube 702 and the head tube 704. Additionally, seals 710 and 712 can prevent contamination of the sliding surface of the bushing by dirt and other particulate matter.

Particular embodiments of the above bushing provide advantageous technical features. In particular, Applicants use of an adhesive film with a modified polymer adhesive, such as modified ETFE, can result in improved adhesion between the friction reducing layer and the load bearing substrate without the use of a surface treatment including chromate or chromic acid. As a result, manufacturing of the bushing can have a reduced impact on the environment and reduced cost for disposal of toxic chemicals.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or"

refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A bushing comprising:
   a load bearing substrate having a first major surface;
   an adhesive film overlying the first major surface and comprising a first layer and a second layer, the first layer being an adhesive layer and the second layer being a fluoropolymer layer, wherein the fluoropolymer layer includes a fluoropolymer and the adhesive layer including a modified form of the fluoropolymer, wherein a thickness ratio of the adhesive layer and the fluoropolymer layer is not less than 1:20; and
   a friction reducing layer overlying the adhesive film.

2. The bushing of claim 1, wherein the adhesive layer includes a modified ethylene tetrafluoroethylene.

3. The bushing of claim 2, wherein the modified ethylene tetrafluoroethylene includes maleic anhydride.

4. The bushing of claim 1, wherein the fluoropolymer layer includes an ethylene tetrafluoroethylene.

5. The bushing of claim 1, wherein the load bearing substrate is in direct contact with the adhesive layer.

6. The bushing of claim 1, wherein the friction reducing layer has a coefficient of friction of not greater than about 0.4.

7. A composite comprising:
   a metal substrate having a first major surface; and
   an adhesive film overlying the first major surface and comprising a first layer and a second layer, the first layer being a modified ethylene tetrafluoroethylene layer and the second layer being an ethylene tetrafluoroethylene layer, the modified ethylene tetrafluoroethylene layer having a thickness of not greater than about 7.5 microns; and
   a friction reducing layer overlying the adhesive layer.

8. The composite of claim 7, wherein the modified ethylene tetrafluoroethylene includes maleic anhydride.

9. The composite of claim 7, wherein the adhesive film has a thickness of about 25 microns to about 75 microns.

10. The composite of claim 7, wherein a thickness ratio of the modified ethylene tetrafluoroethylene layer and the ethylene tetrafluoroethylene layer is not less than 1:20.

11. The composite of claim 10, wherein the thickness ratio is not greater than 1:2.

12. The composite of claim 7, wherein the load bearing substrate is in direct contact with the modified ethylene tetrafluoroethylene layer.

13. The composite of claim 7, wherein the modified ethylene tetrafluoroethylene layer includes a first modified ethylene tetrafluoroethylene layer and a second modified ethylene tetrafluoroethylene layer.

14. The composite of claim 7, wherein the friction reducing layer has a coefficient of friction of not greater than about 0.4.

* * * * *